(12) United States Patent
Tardy et al.

(10) Patent No.: US 12,297,773 B2
(45) Date of Patent: May 13, 2025

(54) REMOVABLE MECHANICAL PART FOR ACOUSTIC INSULATION OF AN AIR INLET CASING

(71) Applicant: SAFRAN POWER UNITS, Toulouse (FR)

(72) Inventors: Laurent Stéphane Tardy, Moissy Cramayel (FR); Jaime Georges Paul Culla, Moissy Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 18/565,281

(22) PCT Filed: Jun. 30, 2022

(86) PCT No.: PCT/FR2022/051308
§ 371 (c)(1),
(2) Date: Nov. 29, 2023

(87) PCT Pub. No.: WO2023/275499
PCT Pub. Date: Jan. 5, 2023

(65) Prior Publication Data
US 2024/0200493 A1 Jun. 20, 2024

(30) Foreign Application Priority Data
Jul. 1, 2021 (FR) .................................. FR2107133

(51) Int. Cl.
*F02C 7/045* (2006.01)
*F02C 3/09* (2006.01)
*B64D 33/02* (2006.01)

(52) U.S. Cl.
CPC ................ *F02C 7/045* (2013.01); *F02C 3/09* (2013.01); *B64D 2033/0206* (2013.01);
(Continued)

(58) Field of Classification Search
CPC .... F02C 3/09; F02C 7/045; B64D 2033/0206; B64D 2033/0213; F05D 2220/50; F05D 2260/96
See application file for complete search history.

(56) References Cited

U.S. PATENT DOCUMENTS

| 5,594,216 A * | 1/1997 | Yasukawa | F02C 7/045 181/294 |
| 2015/0267555 A1* | 9/2015 | Plante | F02K 3/06 415/119 |

(Continued)

FOREIGN PATENT DOCUMENTS

| FR | 3055612 A1 | 3/2018 |
| WO | 2019135058 A1 | 7/2019 |
| WO | 2020058651 A1 | 3/2020 |

OTHER PUBLICATIONS

International Patent Application No. PCT/FR2022/051308, International Search Report, Oct. 7, 2022, 14 pages (12 pages of original document and 2 pages of English translation).

*Primary Examiner* — Audrey B. Walter
(74) *Attorney, Agent, or Firm* — Kilpatrick Townsend & Stockton LLP

(57) ABSTRACT

The invention relates to an acoustic insulation assembly for an auxiliary power unit having a centrifugal compressor (1), comprising a ring-shaped casing (8) for an air inlet (3) and comprising a plurality of reinforcing arms (9) connecting its inner walls, a plurality of removable mechanical acoustic insulation parts (10), each mechanical part (10) being ring-shaped and comprising attachment means (11) intended to engage with the casing (8), such that the mechanical part (10) and the flow surface of the casing (8), defined by a pair of reinforcing arms (9), overlie one another.

9 Claims, 6 Drawing Sheets

(52) U.S. Cl.
CPC .. *B64D 2033/0213* (2013.01); *F05D 2220/50* (2013.01); *F05D 2260/96* (2013.01)

(56) References Cited

U.S. PATENT DOCUMENTS

2020/0339243 A1* 10/2020 Bouillon ................. F02C 7/045
2022/0018283 A1* 1/2022 Jodet ....................... F02C 7/045

* cited by examiner

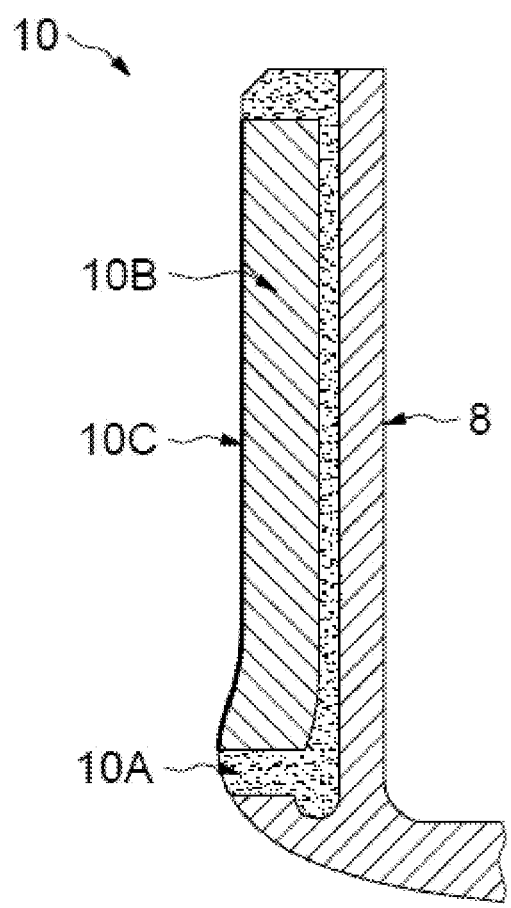
[Fig 3]

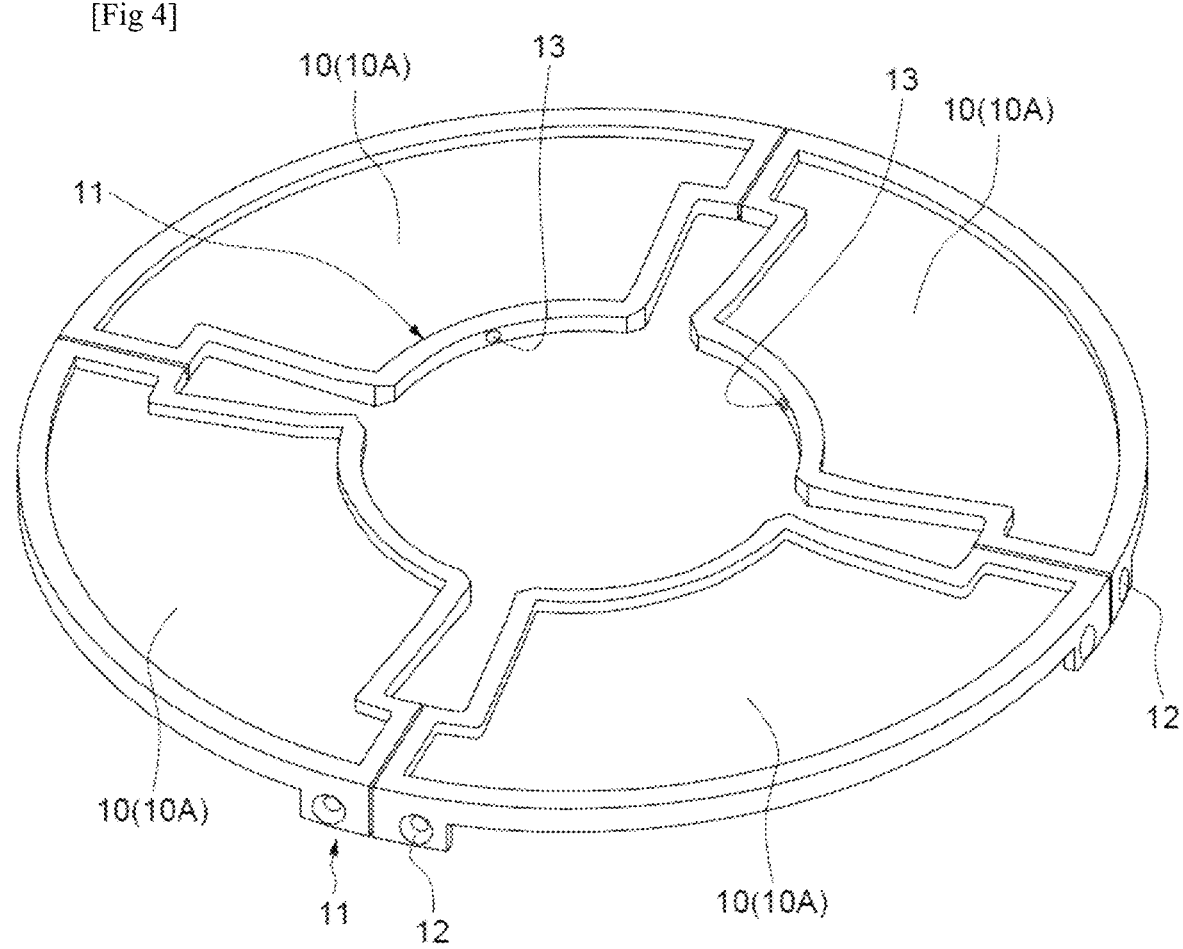
[Fig 4]

[Fig 5]
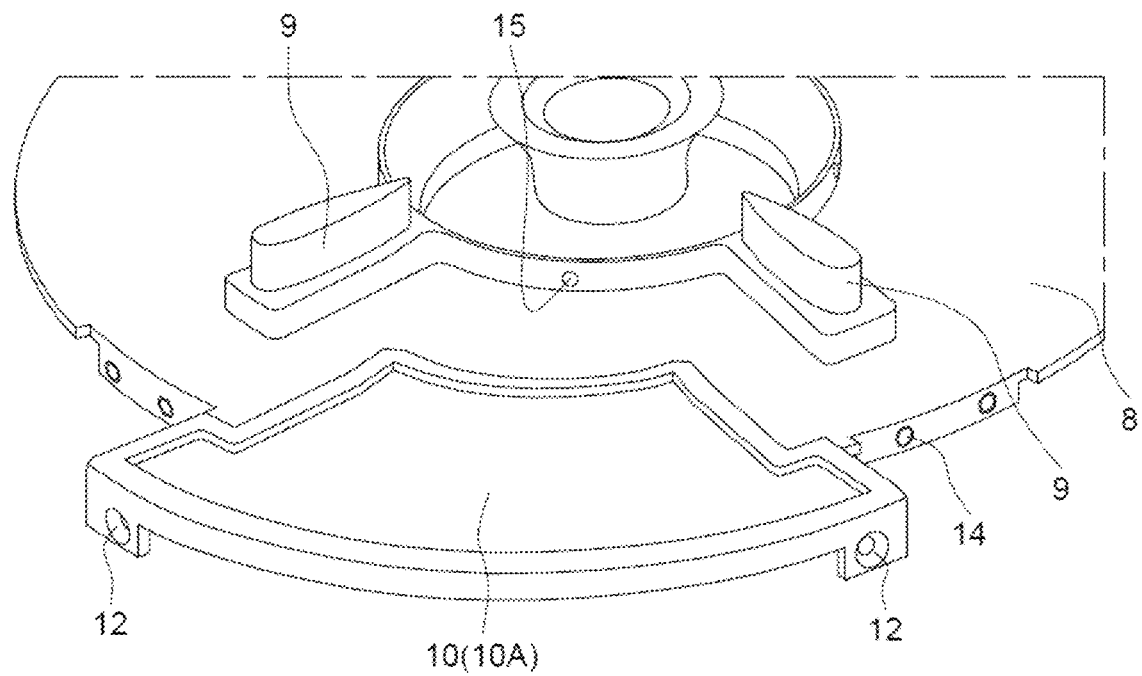

[Fig 6]
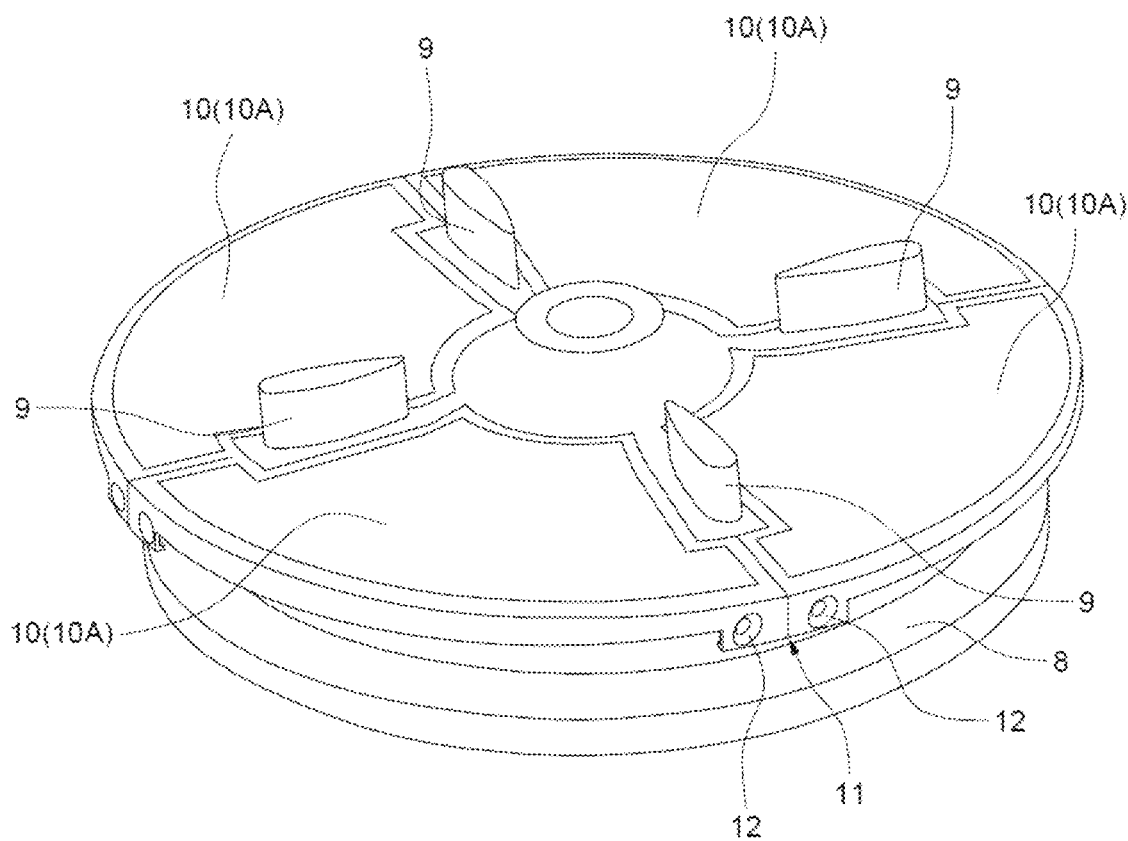

REMOVABLE MECHANICAL PART FOR ACOUSTIC INSULATION OF AN AIR INLET CASING

CROSS REFERENCE TO RELATED APPLICATIONS

This is a U.S. national phase under 35 U.S.C. § 371 of International Patent Application No. PCT/FR2022/051308, filed on Jun. 30, 2022, which claims priority to French Patent Application No. 2107133, filed on Jul. 1, 2021, the entire contents of both of which are incorporated herein by reference in their entireties.

TECHNICAL FIELD

The invention relates to an air inlet casing of an auxiliary power unit and pertains more specifically to the acoustic insulation of such casings.

PRIOR ART

An aircraft generally comprises a powertrain formed by a plurality of turbomachines designed to provide the thrust required to set the aircraft in motion.

Each turbomachine is housed in a nacelle and comprises compressors, combustion chambers, turbines and a fan positioned upstream of an air inlet of the turbomachine.

In order to supply the aircraft's various electrical, mechanical, pneumatic or hydraulic systems with energy and thus reduce the load on the turbomachines, the aircraft comprises an auxiliary power unit typically located at the rear of the fuselage and more specifically in the tail cone of the aircraft.

However, the noise generated by the auxiliary power unit when it is in operation is bothersome to those living near airports.

To this end, such auxiliary power units have to meet noise standards which impose a noise level threshold that the air inlets must not exceed.

In order to reduce the noise generated by the air inlet, various solutions are therefore proposed by aircraft manufacturers such as inserting mechanical parts with a honeycomb acoustic insulation lining into the air inlet.

Such an acoustic lining typically comprises a honeycomb structure and an air-permeable layer intended to be in contact with the air flow circulating inside the air inlet.

The international application with reference WO202058651 describes curved honeycomb acoustic panels located inside the nacelle of a turbomachine and/or on the nacelle of said turbomachine enabling the noise generated by the fan to be reduced.

This solution can also be integrated into the air inlet of the auxiliary power unit, but as this is constantly subjected to vibrations generated by its own engine, the acoustic lining suffers damage as it is used.

Similarly, during take-off or landing phases of the aircraft, the auxiliary power group is likely to ingest foreign bodies of various sizes (birds, ice, etc.).

These incidents may cause violent shocks that can damage part or all of the acoustic lining and impair its performance.

The noise generated by the auxiliary power unit then exceeds the regulatory threshold and must therefore be quickly changed for the aircraft to be returned to service.

The installation of a new acoustic panel involves replacing the entire air inlet casing, which can be a tedious and slow process.

The aim of the invention is therefore to propose an acoustic insulation solution for the air inlet casing which is easily accessible and easy to replace if required during maintenance.

DISCLOSURE OF THE INVENTION

In light of the above, the object of the invention is a removable mechanical part for acoustic insulation of an air inlet casing, the casing being ring-shaped and including a plurality of reinforcing arms connecting its inner walls.

The mechanical part is ring-shaped and comprises attachment means intended to engage with the casing such that the mechanical part and the flow surface of the casing, defined by a pair of reinforcing arms, overlie one another.

As the mechanical part is ring-shaped, it can be removably inserted between two reinforcing arms of the casing.

The mechanical part is therefore arranged on the flow surface of the casing, which significantly reduces the noise generated by the air inlet.

In this way, when the mechanical part is damaged such that its acoustic insulation performance is impaired, it is possible to replace it with another acoustic insulation mechanical part without having to completely dismantle the casing and replace it with another.

As a result, the time required for maintenance operations is significantly reduced.

Advantageously, the attachment means include at least two first housings cut into a radially outer end surface of the mechanical part and at least one second housing cut into a radially inner end surface of the mechanical part, the two first housings each being designed to receive a clamping screw and the second housing being designed to receive a centring pin located on a radially inner end surface of the casing.

In this way, on the one hand, the mechanical part is kept in place by one of the centring pins of the casing designed to be inserted into the second housing of the attachment means and, on the other hand, by the two first housings of the attachment means of the mechanical part and two of the housings of the casing cut into its radially outer end surface.

The two housings of the casing and the two first housings of the attachment means of the mechanical part therefore each receive a clamping screw.

The attachment means arranged in this way make it easier to dismantle the mechanical part.

The mechanical part preferably includes a metallic support flange having an active surface provided with a recessed cavity, an acoustic insulation layer having a honeycomb structure arranged in the cavity, and an air-permeable layer covering the acoustic insulation layer and intended to be in contact with the air flow circulating inside the air inlet.

The acoustic insulation layer and the air-permeable layer are preferably glued together.

Gluing ensures good distribution of mechanical stresses and provides long-term corrosion resistance.

Alternatively, the acoustic insulation layer and the air-permeable layer are welded together.

It is possible to use welding when the air-permeable layer is in the form of woven metal fabrics or in the form of perforated sheets, for instance.

The acoustic insulation layer is advantageously glued to the cavity.

The glue thus enables the first layer to stick to the cavity without applying any great pressure on it.

Another object of the invention is an acoustic insulation assembly for an auxiliary power unit having a centrifugal compressor, comprising a ring-shaped casing for an air inlet including reinforcing arms connecting its inner walls.

The acoustic insulation assembly comprises a plurality of removable mechanical parts for acoustic insulation as defined above, each mechanical part being overlaid on the flow surface of the casing delimited by a pair of said reinforcing arms.

The number of mechanical parts is therefore the same as the number of reinforcing arms of the casing.

The casing advantageously includes an air inlet protective grille.

Such a protective grille prevents foreign object debris from entering the air inlet of the casing and can be fixed to the surface of the casing via the clamping screws used to keep the mechanical part in place.

Another object of the invention is an auxiliary power unit having a centrifugal compressor for aircraft, comprising an acoustic insulation assembly as defined above.

Another object of the invention is an aircraft which comprises an auxiliary power unit as defined above.

BRIEF DESCRIPTION OF THE DRAWINGS

Other aims, characteristics and advantages of the invention will become apparent upon reading the following description, provided purely by way of example and in a non-limiting manner, with reference to the appended drawings in which:

FIG. 3 schematically shows a mechanical part for acoustic insulation according to one embodiment of the invention;

FIG. 4 shows a perspective view of an assembly of four mechanical parts for acoustic insulation according to one embodiment of the invention;

FIG. 5 shows a perspective view of the attachment means for one of the mechanical parts and the casing according to one embodiment of the invention and, FIG. 6 shows the mechanical parts arranged on the radial outer surface of the air inlet casing according to one embodiment of the invention.

DETAILED DESCRIPTION OF THE EMBODIMENTS OF THE INVENTION

Figure 1:
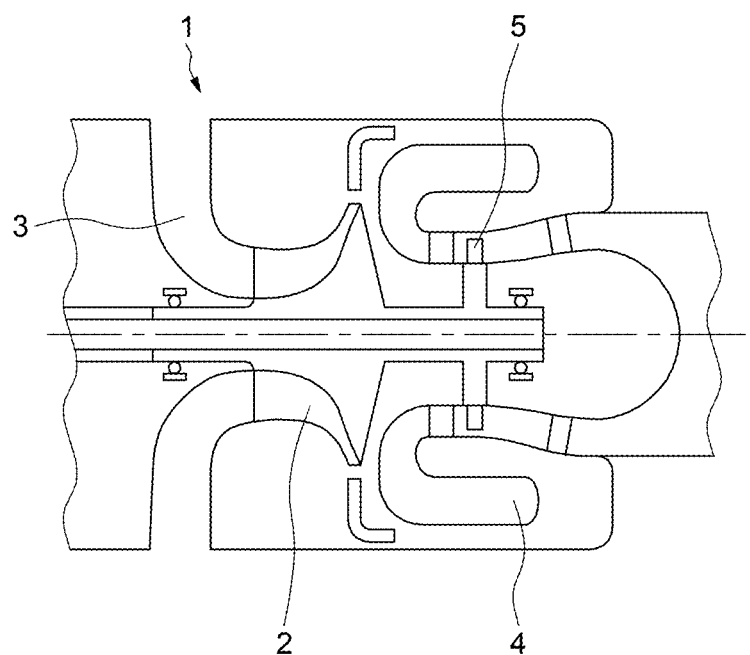
FIG. 1 schematically shows a sectional view of an auxiliary power unit having a centrifugal compressor for aircraft according to the prior art.

FIG. 1 shows an auxiliary power unit 1 having a centrifugal compressor intended to produce electrical, mechanical, pneumatic or hydraulic energy on board on aircraft.

The auxiliary power unit 1 is positioned in the rear of the aircraft and more specifically in the tail cone.

It comprises a compressor 2 designed to receive ambient air via an air inlet 3 in order to compress it and then deliver it to a combustion chamber 4.

The combustion of a fuel, in this case kerosene, in oxygen from the air is then implemented in said chamber 4 to produce energy, a first part of which is intended to rotate at least one turbine 5.

The mechanical energy leaving the turbine 5 then drives another rotating mechanism such as an alternator, compressor, pump or other receiver.

The second part of the hot flow is ejected via an ejection nozzle located downstream of the auxiliary power unit 1.

The auxiliary pressure unit 1 generates noise, and in particular a compressor noise made up in particular of a tonal noise at a given frequency directly linked to the rotor/stator interaction at the compressor. This compressor noise mainly emerges upstream of the auxiliary power unit via the air inlet duct 3. The invention proposes acoustically treating the air inlet duct in order to reduce this noise.

Figure 2:
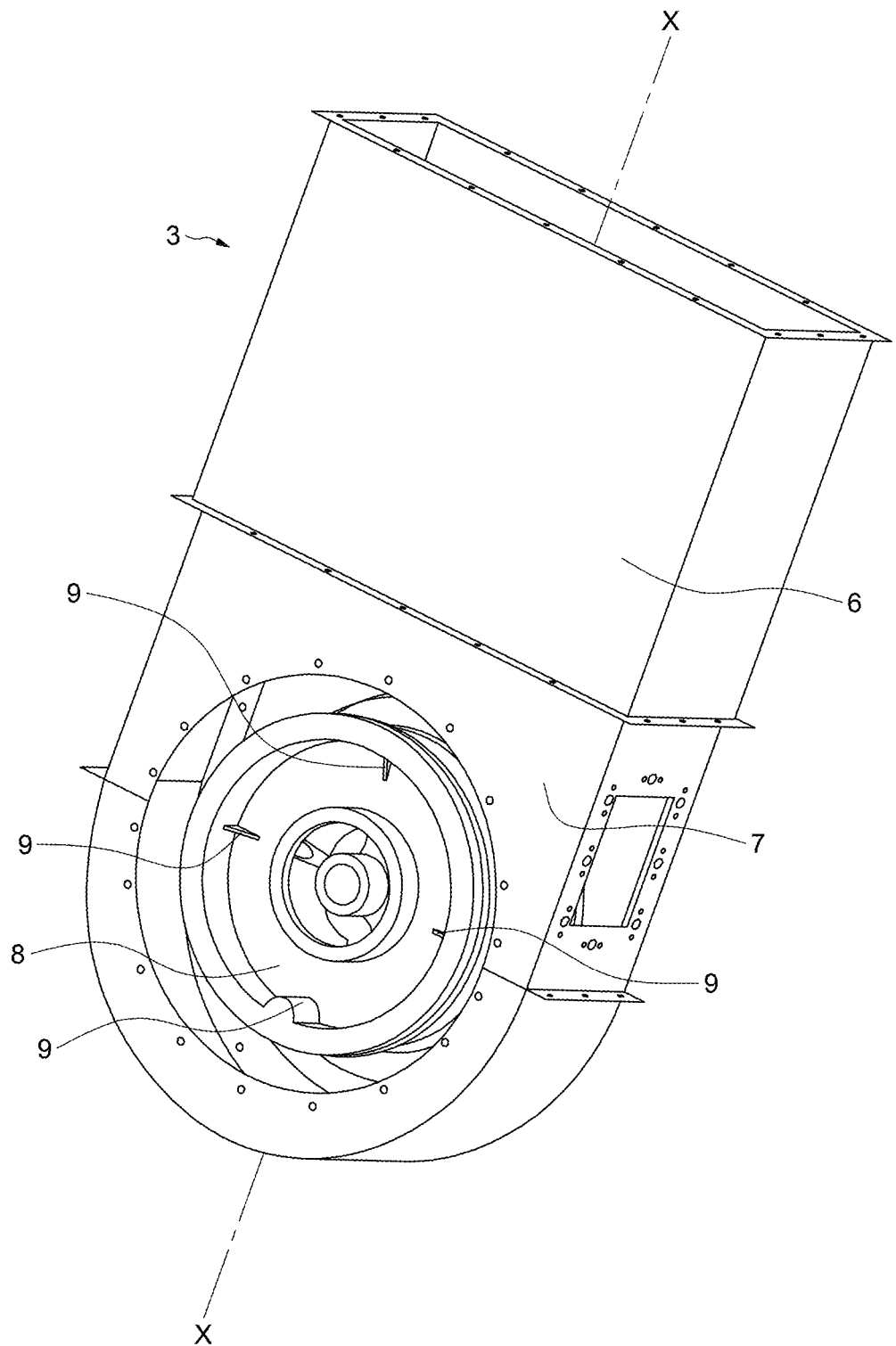
FIG. 2 schematically shows a perspective view of the air inlet of the auxiliary power unit according to the prior art.

To do this, it is proposed to insert removable mechanical parts for acoustic insulation inside the air inlet 3 shown in FIG. 2.

Such an air inlet 3 extends along a longitudinal axis X-X' and includes a duct 6 intended to convey the ambient air to the compressor 2 via a plenum 7.

A ring-shaped casing 8 is arranged inside the plenum 7 and includes a plurality of reinforcing arms 9, in this case four, designed to connect the inner walls of said casing 8.

It is between each pair of reinforcing arms 9 that the removable mechanical parts for acoustic insulation 10 are positioned on the flow surface of the casing 8.

"Flow surface" is understood to be mean a surface adjacent to the flow of air in the casing 8.

Such a mechanical part 10 shown in FIG. 3 is acoustically treated to reduce the noise in the air inlet 3.

More specifically, the mechanical part for acoustic insulation 10 comprises a metallic support flange 10A having an active surface provided with a recessed cavity, an acoustic insulation layer 10B having a honeycomb configuration for example, and a so-called resistive and air-permeable layer 10C.

The metallic support flange 10A has an attachment face formed by a radial surface intended to be positioned in contact with an inner radial surface (flow surface of the casing 8), and an opposite face intended to face the inside of the casing 8 and which receives the acoustic insulation layer 10B.

The resistive air-permeable layer 10C is then arranged on the acoustic insulation layer 10B by gluing or welding when the resistive layer 10C is in the form of woven metal fabrics or in the form of perforated sheets.

FIG. 4 shows an assembly of four ring-shaped mechanical parts for acoustic insulation 10 which is adapted to the shape of the casing 8.

In order to keep the mechanical part 10 in place on the flow surface of the casing 8, the metallic support flange 10A of the mechanical part 10 comprises attachment means 11.

The attachment means 11 are intended to engage with the casing 8 such that the mechanical part 10 and the flow surface of the casing 8, defined by a pair of reinforcing arms 9, overlie one another.

More specifically, the attachment means 11 include two first housings 12 cut into a radially outer end surface of the mechanical part 10 and a second housing 13 cut into a radially inner end surface of the mechanical part 10.

More specifically, the housings 12 and 13 are formed in the metallic support flange 10A of the mechanical part 10.

The two first housings 12 are designed to each receive a clamping screw, whilst the second housing is designed to receive a centring pin located on a radially inner end surface of the casing 8.

In this way, as shown in FIG. 5, the two first housings 12 each come into contact with two housings 14 cut into a radially outer end surface of the casing 8.

A first clamping screw can then be inserted into one of the two first housings 12 and into one of the two housings 14 of the casing 8.

A second clamping screw will subsequently be inserted into the remaining first housing 12 and the housing 14 of the casing 8.

Similarly, the centring pin 15 of the casing 8 is inserted into the second housing 13 of the mechanical part 10.

Thanks to the attachment means 11, each mechanical part 10 can be held in position between a pair of reinforcing arms 9 as shown in FIG. 6.

The mechanical part 10 can then be dismantled without completely removing the casing 8 during maintenance.

Furthermore, the invention is not limited to these embodiments and implementations, but embraces all variants. For example, the mechanical parts for acoustic insulation 10 can be arranged on any ring-shaped casing integrated into any type of device.

The invention claimed is:

1. An acoustic insulation assembly for an auxiliary power unit having a centrifugal compressor, the acoustic insulation assembly comprising:
   a ring-shaped casing for an air inlet including a plurality of reinforcing arms connecting inner walls of the ring-shaped casing, wherein the air inlet is an air inlet of the centrifugal compressor,
the acoustic insulation assembly comprising:
   a plurality of mechanical acoustic insulation parts, each mechanical part being ring-shaped and comprising attachment means to engage with the casing such that the mechanical part and a flow surface of the casing, defined by a pair of reinforcing arms of the plurality of reinforcing arms, overlie one another.

2. The acoustic insulation assembly according to claim 1, wherein the attachment means include at least two first housings cut into a radially outer end surface of the mechanical part and at least one second housing cut into a radially inner end surface of the mechanical part, the two first housings each being designed to receive a clamping screw and the second housing being designed to receive a centering pin located on a radially inner end surface of the casing.

3. The acoustic insulation assembly according to claim 1, wherein each mechanical part includes a metallic support flange having an active surface provided with a recessed cavity, an acoustic insulation layer having a honeycomb structure arranged in the cavity, and an air-permeable layer covering the acoustic insulation layer to be in contact with air flow circulating inside the air inlet.

4. The acoustic insulation assembly according to claim 3, wherein the acoustic insulation layer and the air-permeable layer are glued together.

5. The acoustic insulation assembly according to claim 3, wherein the acoustic insulation layer and the air-permeable layer are welded together.

6. The acoustic insulation assembly according to claim 3, wherein the acoustic insulation layer is glued to the cavity.

7. The acoustic insulation assembly according to claim 6, wherein the casing includes an air inlet protective grille.

8. An auxiliary power unit having a centrifugal compressor for aircraft, the auxiliary power unit comprising the acoustic insulation assembly according to claim 1.

9. An aircraft comprising the auxiliary power unit according to claim 8.

\* \* \* \* \*